Nov. 25, 1930.  J. A. L. ROZIERES  1,782,974
APPARATUS FOR RECOVERING FATS FROM EMULSIONS
CONTAINING SOLID PARTICLES
Filed July 16, 1928   2 Sheets-Sheet 1
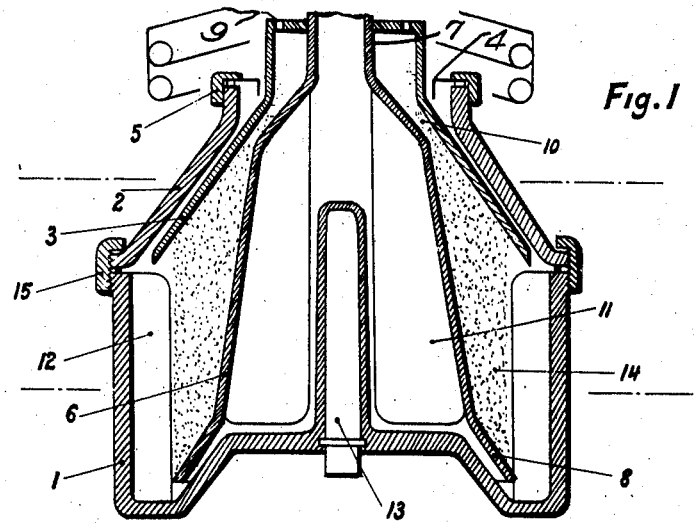
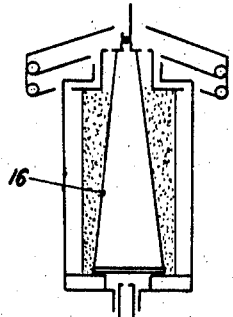
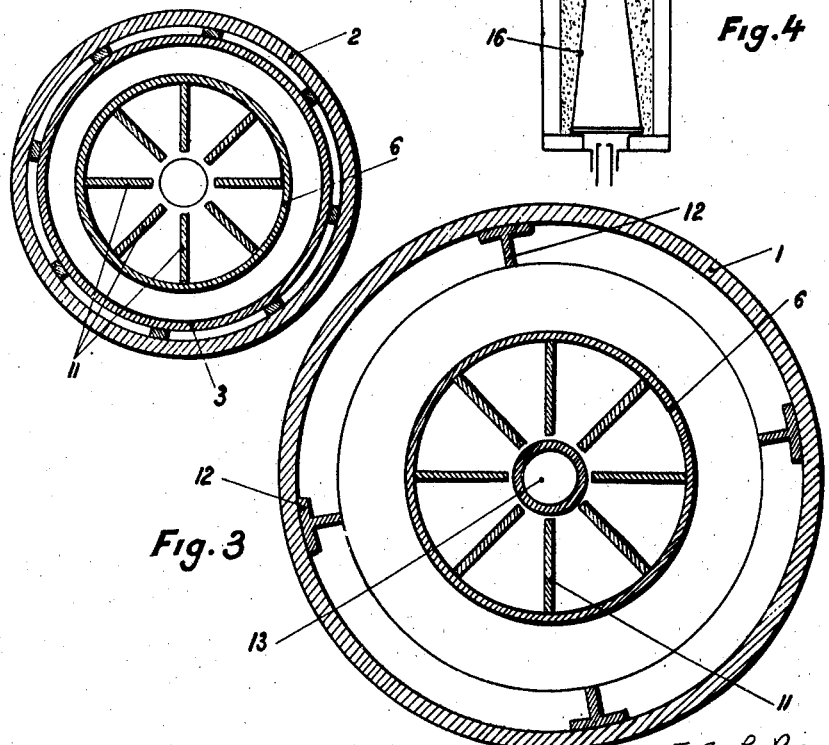
J. A. L. Rozieres
INVENTOR
By: Marks & Clerk
Attys.

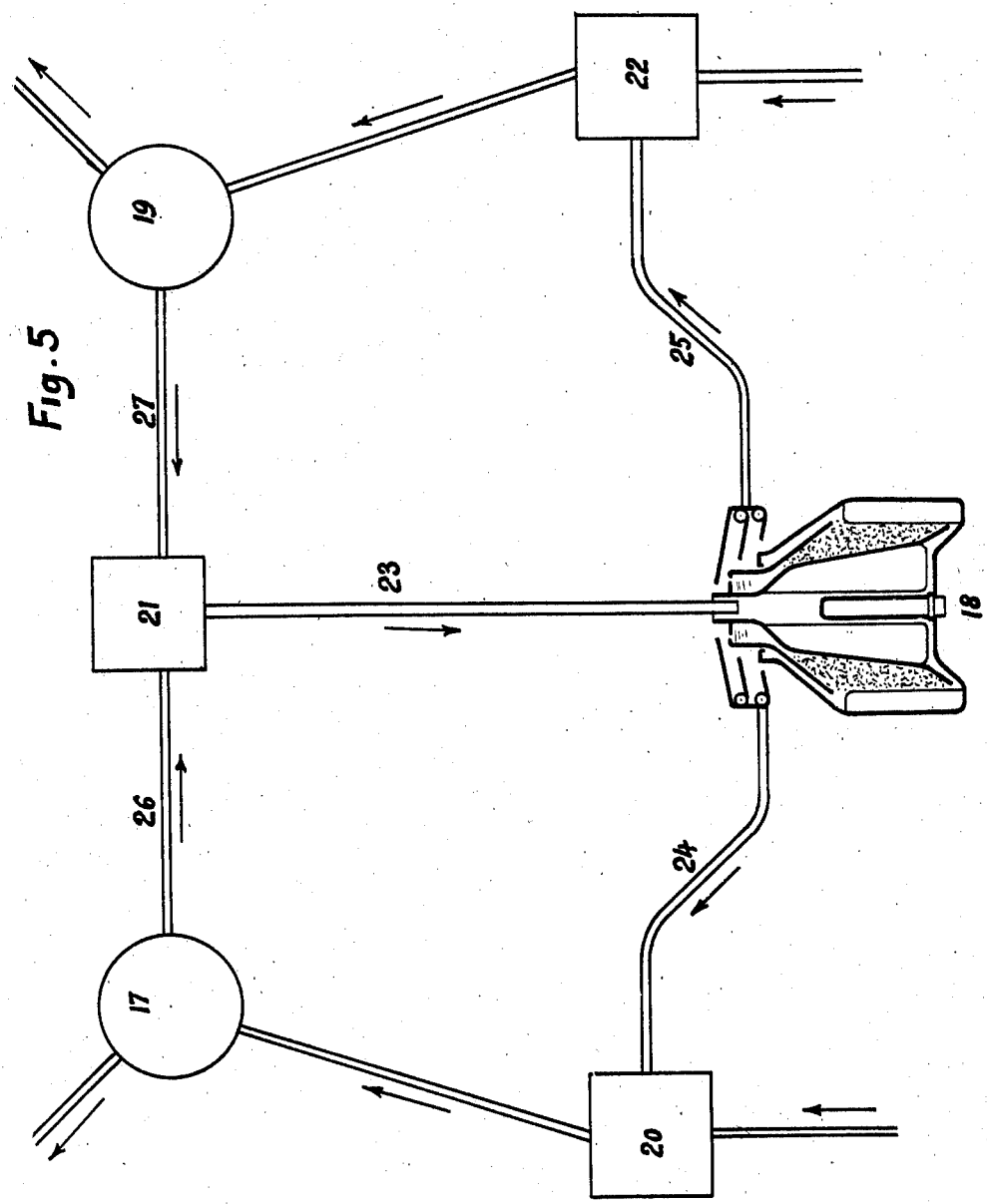

Patented Nov. 25, 1930

1,782,974

UNITED STATES PATENT OFFICE

JEAN ALFRED LOUIS ROZIÉRES, OF PARIS, FRANCE, ASSIGNOR OF ONE-HALF TO SOCIETE FRANCAISE DE CENTRIFUGATION, OF PARIS, FRANCE, A FRENCH COMPANY

APPARATUS FOR RECOVERING FATS FROM EMULSIONS CONTAINING SOLID PARTICLES

Application filed July 16, 1928, Serial No. 293,088, and in France October 11, 1927.

It is a known fact that the woolen threads used for weaving must be moistened with about 10% of its weight of olein in order to acquire a greater tensional resistance and to prevent its breaking during weaving. When the weaving is ended, the finished woolen goods are washed in alkaline lyes so as to remove the fats whereby a small amount of wool is dissolved.

The olein is then set free through an addition of acid and the wool is precipitated in a colloidal form. The decanted mud thus obtained contains about:

6% olein

2% wool appearing through addition of acid, as a colloidal mass

92% water

Several processes and apparatuses have been proposed for recovering the olein, but none has proved satisfactory.

My invention has for its object an apparatus for separating in a very easy manner, the fat contained in emulsions containing also solid particles.

My improved apparatus allows the addition of a solvent to the emulsion, the specific weight of which is greater than that of the solid particles contained in the emulsion and the boiling point of which is lower than that of the fats. The mixture is then treated in a centrifugal apparatus, where the solid particles are driving the upper part of the mixture from whence they can be extracted, while the fat containing solvent is driven to the lower part and extracted. The emulsion is caused to pass, according to the counter-current principle, in a series of devices, each comprising a centrifugal apparatus associated with a mixer, each mixer receiving the emulsion from which fat has been removed in the centrifugal apparatus of the preceding arrangement together with the solvent, which has dissolved fat in the succeeding apparatus. This mixture is then sent into the corresponding centrifugal apparatus which, after operation, sends the emulsion, from which a further amount of fat has been removed, into the next mixer and the solvent which has dissolved the said fat into the preceding mixer. The solvent after passing through the whole plant is distilled for recovering the fats.

Through the agency of this continuously operating apparatus I obtain an emulsion after it has passed through the plant, which is almost completely freed of fatty material and contains a small proportion of solvent which it is easy to recover by distillation.

The amount of solvent such as ethylene trichloride required for operation, and which is recovered at the delivery end, is not very great as compared with the amount of fat in the emulsion. Therefore the heat required for recovering the dissolved fats by distillation is small and as the solvent is recovered, the efficiency of the process is considerably greater than that of the processes used heretofore for recovering fats from emulsions of the kind described.

I have devised a centrifugal apparatus adapted for operating on such mixture of solvent and emulsion which cannot be treated in an ordinary apparatus. The residues carried by the water which has washed the wool contain:

1. Heavy impurities such as earth, sand and the like.

2. Solvent containing fat in solution, chiefly olein.

3. A comparatively great amount of precipitated pulverized wool.

4. A great amount of water.

Such centrifugal apparatuses in which inlet and exhaust are disposed on the same side by the use of a centrifugal bowl for instance, show the following disadvantages:

1. When the liquid arrives in the distributor or inner sleeve of the apparatus, which is cylindrical or nearly cylindrical, the impurities, such as earth, sand and the like, adhere to the wall of the distributor by reason of the centrifugal force and may thus clog and stop the conduit.

2. During operation the liquid entering the bowl forms three layers to wit: on the outside a thick layer of fat containing solvent, then a thick layer of pulverized wool, and lastly, in contact with the outer wall of the distributor, a layer of water which is very thin if the apparatus is properly adjusted. This water flows along the surface of the mass of pulverized wool contained in the bowl without renewing the mass of wool in the apparatus which finally forms a sort of felt and clogs the apparatus the output of which is thus considerably reduced.

In those apparatuses the bowl of which is suspended or set on a support and wherein the admission is on the side opposed to the delivery, the first drawback mentioned hereinabove does not exist as there is no central rotary distributor; but the second drawback exists as the film of wool containing water flowing over the heavy layer of wool filling the apparatus, cannot renew the said layer by removing it, whereby the efficiency of the apparatus is diminished as explained hereinabove.

My invention removes these disadvantages by giving the space inside the bowl, filled by water and pulverized wool, a tapered shape, the walls of said bowl tapering towards the delivery end. If the apparatus is provided with a distributor wherein the inlet has a direction opposed to that of the outlet, the said distributor is bell-mouthed at its outlet.

I have described hereinbelow by way of example and shown on appended drawing a form of execution of my invention.

Fig. 1 is a diagrammatical axial section of one of the centrifugal apparatuses used with a bowl supported from below.

Figs. 2 and 3 are horizontal sections along lines II—II and III—III of Fig. 1.

Fig. 4 is a diagrammatical section of an apparatus of the suspended bowl type; the section being taken through a vertical plane passing through its axis.

Fig. 5 is a general diagrammatical view of the arrangement according to my invention.

As shown on Fig. 5 the apparatus comprises a series of units 17—20, 18—21, 19—22 each comprising a centrifugal apparatus 17, 18 or 19 and a mixer 20, 21 or 22. A pipe 23 leads the mixture from the mixer 21 to the corresponding centrifugal apparatus 18, whereas pipe 24 returns the purified solvent passing out of 18 to the mixer 20 of the preceding group and pipe 25 sends the fat-containing mixture from which the solid matter has been removed into the mixer 22 of the next unit. The corresponding mixer 21 is fed through 26 with a fat containing mixture passing out of the centrifugal apparatus 17 and through pipe 27 with the solvent from the centrifugal apparatus 19, the outlet from the mixer being connected as stated through 23 with 18.

Each mixer is thus provided with an outlet connected with its corresponding centrifugal apparatus and in the second place with two inlets connected with the centrifugal apparatus of the preceding and succeeding set. In a similar manner each centrifugal apparatus is provided with an inlet connected with the corresponding mixer and with two outlets connected respectively with the mixers of the preceding and succeeding sets.

The centrifugal apparatus shown on Fig. 1 comprises a rotary bowl 1 having the shape of a cylinder provided with a conical top 2 and secured to the pivot 13; inside the cone 2 and very near it is disposed a second conical casing 3. Between the two conical walls 2 and 3 is provided an annular outlet 4 for the heavier liquid on the outside of which is disposed the ring 5. This arrangement is well known per se.

Along the axis of the apparatus is disposed the distributor with its inlet pipe 7 merging into the conical part 6 the angle of which is about 20°. This part 6 is continued by another conical part or flaring apron 8 having a larger angle. The upper conical part connecting part 6 and the inlet pipe is separated by an annular narrow outlet 10 from the casing 3. This outlet leads to the delivery apertures 9.

The distributor is provided with inner fins 11 and the bowl is provided at its lower part with fins 12.

The whole is carried by the pivot 13 and is adapted to rotate round the common axis of the several conical parts described.

The operation is as follows: The apparatus being rotated at a great speed, the water carrying the wool passes through pipe 7 and enters the distributor 6. The fins 11 make it rotate with the apparatus whereby the centrifugal force causes the heavy particles of earth, sand and the like, to come against the inner wall of the distributor but due to the bell-shaped form of the latter this centrifugal force will cause them to fall until they arrive against the wall of the bowl 1 which is large enough to contain all the heavy particles which depose between two stoppages and cleanings of the apparatus.

The mixture of water, pulverized wool and heavy olein containing solvent enters the bowl and is rotated by the fins 12; under the action of the centrifugal force the olein containing solvent which is heavier than the rest of the mixture comes against the peripheral wall of the bowl 1 and when the amount of solvent is sufficient, it passes through the annular outlet 4 as well known in the art.

The water and the pulverized wool which are lighter than the solvent remain at the center of the apparatus at 14 and the water which is lighter than the pulverized wool is driven towards the axis of the apparatus; due to the conical shape of the parts 8, 6 and 3 and to the position of the passage 10 th whole mass of pulverized wool in the apparatus is continuously removed and renewed; the water draws along with it the wool particles from the chamber between parts 6 and 3 as new wool is carried into the said chamber whereby the separation is as perfect as possible.

The mixture passing out of the centrifugal apparatus and constituted by a dissolution of olein or ethylene trichlorine for instance should have a specific weight of about 35° Baumé as too great a proportion of olein would make the mixture too light and allow it to carry the particles of wool with it against the wall of the centrifugal bowl.

The working of my improved apparatus as compared with the apparatuses commonly used is somewhat similar to that of a chimney the hearth of which is provided with a conical or pyramidal hood wherein the hot ascending air forms threads without any eddies which converge towards the outlet and draw along with them all the smoke existing in the space through which they pass. If, on the contrary, the hearth were provided with a flat topped hood, there would be dead spaces formed in the angles of the hood where the smoke would accumulate. A similar phenomenon occurs with emulsions of the type considered in the centrifugal apparatuses used nowadays in which the part corresponding to part 6 is cylindrical.

It is easy to imagine a similar device, the bowl of which is hung or supported and the outlet of which is on the side opposite that corresponding to the inlet. As shown on Fig. 1 I dispose inside the bowl a conical part 16, Fig. 4, the apex of which is on the outlet side, so as to provide a suitable tapering passage for the water.

What I claim is:

1. A plant for recoving fats contained in emulsions such as wash waters of wools, solvent heavier than water and solid particles; comprising several groups of apparatus, each group including a mixer and a centrifugal apparatus, means for introducing simultaneously in the mixer of each group the partly exhausted emulsion coming from the centrifugal apparatus of the former group and the solvent heavier than water, in which the proportion of dissolved fat has been increased and coming from the centrifugal apparatus of the following group, and means for transferring the emulsion formed inside the mixer into the centrifugal apparatus of the same group.

2. A plant for recovering fats contained in emulsions such as wash waters of wools, solvent heavier than water and solid particles; comprising several groups of apparatus, each group including a mixer and a centrifugal apparatus consisting of an outer rotary bowl, a conical distributor within the bowl, a conical partition between the bowl and the distributor forming with the narrower portion of the latter, a narrow, annular, convergent outlet, and means for providing an outlet between the bowl and the outer end of the partition.

3. A plant for recovering fats contained in emulsions such as wash waters of wools containing water, solvent heavier than water and solid particles; comprising several groups of apparatus, each group including a mixer and a centrifugal apparatus consisting of an outer rotary bowl, a conical distributor inside the bowl the walls of the wider part of which are less inclined with reference to the axis of the bowl than those of the narrower part, a conical partition between the distributor and the bowl substantially parallel to the narrower part of the distributor, extending in front of both portions of the distributor and affording an outlet at each end between itself and the bowl and distributor respectively.

4. A plant for recovering fats contained in emulsions such as wash waters of wools, solvent heavier than water and solid particles, comprising several groups of apparatus, each group including a mixer and a centrifugal apparatus consisting of outer rotary bowl, a conical distributor inside the bowl, the walls of the wider part of which are less inclined with reference to the axis of the bowl than those of the distributor, the bowl being substantially parallel to the narrower part of the distributor extending in front of part of both portions of the distributor and affording an outlet at each end between itself and the bowl and distributor respectively.

5. A plant for recovering fats contained in emulsions such as wash waters of wools, solvent heavier than water and solid particles, comprising several groups of apparatus, each group including a mixer and a centrifugal apparatus consisting of an outer rotary bowl, a conical distributor inside the bowl, the walls of the wider part of which are less inclined with reference to the axis of the bowl than those of the distributor, the bowl being substantially parallel to the narrower part of the distributor extending in front of part of both portions of the distributor and a conical cover for the bowl on the outside of and substantially parallel to the partition, outlets being provided between the wider ends of the partition and cover and between the narrower ends of the partition and distributor.

6. A plant for recovering fats contained in emulsions such as wash waters of wools, solvent heavier than water and solid particles, comprising several groups of apparatus, each group including a mixer and a centrifugal apparatus consisting of an outer rotary bowl, a conical distributor inside the bowl, the walls of the wider part of which are less inclined with reference to the axis of the bowl than those of the narrower part, and a conical extension at the outer end of the distributor substantially parallel to the narrower part of the latter, a conical partition between the distributor and the bowl substantially parallel to the narrower part of the distributor, extending in front of both portions of the distributor and affording an outlet at each end between itself and the bowl and distributor respectively.

7. A plant for recovering fats contained in emulsions such as wash waters of wools, solvent heavier than water and solid particles, comprising several groups of apparatus, each group including a mixer and a centrifugal apparatus consisting of an outer rotary bowl, a conical distributor inside the bowl the wider part of which is inclined at about 20° with reference to the axis of the bowl and the narrower part of which is more inclined, a conical partition between the distributor and the bowl substantially parallel to the narrower part of the distributor and extending in front of both portions of the distributor outlets being provided between the wider end of the partition and the bowl and between the narrower ends of the distributor and the partition.

8. A plant for recovering fats contained in emulsions such as wash waters of wools, solvent heavier than water and solid particles comprising several groups of apparatus, each group including a mixer and a centrifugal apparatus consisting of a vertical outer rotary bowl, a conical distributor inside the bowl the walls of the lower wider part of which are less inclined with reference to the axis of the bowl than those of the distributor, the bowl being substantially parallel to the narrower part of the distributor extending in front of part of both portions of the distributor, and means for feeding a mixture to the lower end of the distributor, outlets being provided between the upper ends of the distributor and partition and between the lower end of the partition and the bowl.

In testimony whereof I have affixed my signature.

JEAN ALFRED LOUIS ROZIÉRES.